No. 701,662. Patented June 3, 1902.
L. T. F. ZAISER.
BAKER'S STENCIL.
(Application filed May 31, 1901.)
(No Model.)

WITNESSES:
C. S. Frye
T. H. Colvin.

INVENTOR
Lenoir T. F. Zaiser,
BY
Chester Bradford,
ATTORNEY

UNITED STATES PATENT OFFICE.

LENOIR T. F. ZAISER, OF INDIANAPOLIS, INDIANA.

BAKER'S STENCIL.

SPECIFICATION forming part of Letters Patent No. 701,662, dated June 3, 1902.

Application filed May 31, 1901. Serial No. 62,576. (No model.)

*To all whom it may concern:*

Be it known that I, LENOIR T. F. ZAISER, a citizen of the United States, residing at Indianapolis, in the county of Marion and State of Indiana, have invented certain new and useful Improvements in Bakers' Stencils, of which the following is a specification.

The object of my present invention is to provide a means whereby bread in baking shall be clearly labeled, and thus avoid the use of paper or other separate labels which have commonly been attached to the loaves of bread after they have been baked. Stencil-plates for this purpose have heretofore been constructed in various forms. In such plates there is a tendency in some of the baking operations to generate steam from the moisture in the dough, and this will gather in the spaces formed by the letter or other marking-matrices in the stencil-plate and force the dough out of said spaces, and thus obliterate the markings which would otherwise result or render the same very indistinct.

In my invention I form the matrices in the stencil-plate only part-way through the plate (so far as the general outline of the letters or characters forming the inscription is concerned) and then form small orifices at numerous points in said matrices extending the remaining way through the plate, so that said matrices are thoroughly ventilated and any steam or gases which may gather therein has abundant room to escape. The plates themselves may of course be made in any desired form.

Figure 1:
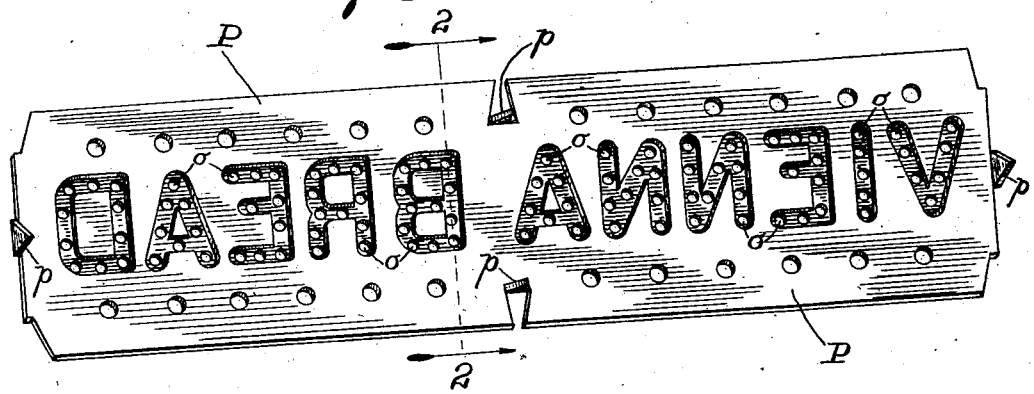
Figure 2:
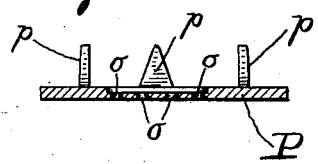

In the drawings, of which Figure 1 is a perspective view and Fig. 2 a transverse sectional view as seen when looking in the direction indicated by the arrows from the dotted line 2 2 in Fig. 1, I have shown a form of plate suitable to be used on that sort of loaves which are baked in ovens without the use of any pans. This plate P is provided with projections $p$, and in use the plate is laid upon the dough loaf before it is placed in the oven, and these projections enter the substance thereof and serve to hold the plate in the position in which it is placed. The loaf is then placed in the oven, with this plate resting on the bottom of the oven, and the soft dough sinks into and fills the matrices which have been cut therein to produce the inscription desired. The numerous small orifices which have been formed through the remaining portion of the plate provide a ready means of escape for the steam or gases which may be generated during the baking operation, as before explained, so that the resulting inscriptions on the loaves are clear and perfect.

My invention can of course be also made use of where the loaves are baked in pans, in which case the plates containing the letter-matrices will be riveted or otherwise firmly secured inside and to the bottom of the pans.

Having thus fully described my said invention, what I claim as new, and desire to secure by Letters Patent, is—

A baker's stencil for marking loaves of bread during the process of baking formed of a comparatively thin plate with the marking-matrices extending a portion of the way only through said plate, and having small perforations in the bottom of said matrices extending the rest of the way through said plate, substantially as described and for the purposes specified.

In witness whereof I have hereunto set my hand and seal, at Indianapolis, Indiana, this 25th day of May, A. D. 1901.

LENOIR T. F. ZAISER. [L. S.]

Witnesses:
 CHESTER BRADFORD,
 S. H. COLVIN.